United States Patent
Ramsayer et al.

(10) Patent No.: US 10,150,182 B2
(45) Date of Patent: Dec. 11, 2018

(54) WELDING METHOD INCLUDING WELDING AS A FUNCTION OF AN ASCERTAINED WELDING DISTORTION; WELDING DEVICE INCLUDING A DETECTION UNIT FOR DETECTING A MISALIGNMENT OF THE WORKPIECES; JOINED PART

(75) Inventors: Reiner Ramsayer, Schwieberdingen (DE); Axel Bormann, Bamberg (DE); Marita Geisendoerfer-Pipp, Heroldsbach (DE); Sonja Kittel, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 686 days.

(21) Appl. No.: 13/138,650

(22) PCT Filed: Feb. 19, 2010

(86) PCT No.: PCT/EP2010/052120
§ 371 (c)(1),
(2), (4) Date: Nov. 23, 2011

(87) PCT Pub. No.: WO2010/112266
PCT Pub. Date: Oct. 7, 2010

(65) Prior Publication Data
US 2012/0061357 A1  Mar. 15, 2012

(30) Foreign Application Priority Data
Mar. 30, 2009 (DE) .................. 10 2009 001 986

(51) Int. Cl.
*B23K 26/24* (2014.01)
*B23K 26/28* (2014.01)
(Continued)

(52) U.S. Cl.
CPC .............. *B23K 26/24* (2013.01); *B23K 26/04* (2013.01); *B23K 26/06* (2013.01); *B23K 31/00* (2013.01);
(Continued)

(58) Field of Classification Search
CPC ................ B23K 26/032; B23K 26/046; B23K 26/0626; B23K 26/041; B23K 26/043;
(Continued)

(56) References Cited

U.S. PATENT DOCUMENTS 5,440,099 A * 8/1995 Smith ........................ 219/137 R
6,184,987 B1 * 2/2001 Jang ........................ G01D 5/268
356/388

(Continued)

FOREIGN PATENT DOCUMENTS

DE           19903881 A1 * 8/2000
DE   10 2006 015 383      10/2007
(Continued)

OTHER PUBLICATIONS

Machine translation of Japan Patent No. 2001-129,677, Aug. 2014.*
(Continued)

*Primary Examiner* — Geoffrey S Evans
(74) *Attorney, Agent, or Firm* — Norton Rose Fulbright US LLP; Gerard Messina

(57) ABSTRACT

In a laser welding method for joining a first workpiece to a second workpiece, the first and the second workpieces are brought into contact with each other in a first method step, an intended welding distortion is ascertained in a second method step, and the first and the second workpieces are welded together in a third method step as a function of the welding distortion.

3 Claims, 3 Drawing Sheets

(51) Int. Cl.
  *B23K 26/03* (2006.01)
  *B23K 26/04* (2014.01)
  *B23K 26/06* (2014.01)
  *B23K 31/00* (2006.01)
  *B23K 31/12* (2006.01)
  *B23K 37/04* (2006.01)
  *B23K 37/047* (2006.01)
  *B23K 101/18* (2006.01)

(52) U.S. Cl.
  CPC ............ *B23K 31/003* (2013.01); *B23K 31/12* (2013.01); *B23K 37/047* (2013.01); *B23K 37/0426* (2013.01); *B23K 2201/18* (2013.01)

(58) Field of Classification Search
  CPC ........ B23K 26/22; B23K 26/28; B23K 26/04; B23K 26/06; B23K 26/24; B23K 31/00; B23K 31/003; B23K 31/12; B23K 37/0426; B23K 37/047; B23K 2201/18
  USPC ............. 219/121.62, 121.63, 121.64, 121.83
  See application file for complete search history.

(56) References Cited

U.S. PATENT DOCUMENTS

| | | | |
|---|---|---|---|
| 6,462,299 B1* | 10/2002 | Takeda et al. | 219/121.64 |
| 6,478,480 B1* | 11/2002 | Sasaki et al. | 219/121.64 |
| 6,590,180 B1* | 7/2003 | Suh et al. | 219/121.63 |
| 6,627,841 B2 | 9/2003 | Chen et al. | 219/110 |
| 6,717,098 B2* | 4/2004 | Matsushita | 219/121.63 |
| 6,919,528 B2* | 7/2005 | Shirai et al. | 219/121.63 |
| 9,522,441 B2* | 12/2016 | Zeadan | B23K 26/032 |
| 2002/0019726 A1 | 2/2002 | Crilly et al. | |
| 2002/0033385 A1* | 3/2002 | Alte et al. | 219/121.46 |
| 2002/0134816 A1 | 9/2002 | Chen et al. | |
| 2005/0178751 A1 | 8/2005 | Adelmann et al. | |
| 2005/0247686 A1* | 11/2005 | Child | 219/124.34 |
| 2005/0284850 A1* | 12/2005 | Boyd | 219/121.63 |
| 2006/0213878 A1* | 9/2006 | Namiki | 219/121.63 |
| 2007/0210047 A1* | 9/2007 | Child | 219/124.34 |
| 2008/0262799 A1* | 10/2008 | Murakawa et al. | 703/1 |
| 2009/0231563 A1* | 9/2009 | Staals et al. | 355/53 |
| 2011/0198316 A1* | 8/2011 | Legori et al. | 219/61.1 |

FOREIGN PATENT DOCUMENTS

| | | | |
|---|---|---|---|
| GB | 1 333 652 | | 10/1973 |
| JP | 61-123494 A | * | 6/1986 |
| JP | 61-235087 A | * | 10/1986 |
| JP | 63-118015 | | 5/1988 |
| JP | 4-157080 | | 5/1992 |
| JP | 4-190990 A | * | 7/1992 |
| JP | 7-266069 | | 10/1995 |
| JP | 8-164490 A | * | 6/1996 |
| JP | 8-257773 A | * | 10/1996 |
| JP | 8-300008 A | * | 11/1996 |
| JP | 10-328860 | | 12/1998 |
| JP | 2000-94164 | | 4/2000 |
| JP | 2001-129677 A | * | 5/2001 |
| JP | 2001-252778 | | 9/2001 |
| JP | 2003-140003 A | * | 5/2003 |
| JP | 2005-259620 | | 9/2005 |
| JP | 2010-017731 A | * | 1/2010 |
| WO | WO 2007/004983 | | 1/2007 |
| WO | WO-2010/046390 A1 | * | 4/2010 |

OTHER PUBLICATIONS

Machine translation of Japan Patent No. 8-164,490, Dec. 2014.*
Machine translation of Japan Patent No. 8-300,008, Dec. 2014.*
Josserand et al., "Numerical Simultation of welding induced distortions taking into account industrial clamping conditions", Dec. 2007, Graz University of Technology, in book "Mathematical Modeling of Weld Phenomena 8", edited by Cerjak et al., pp. 1073-1092.*
Cheng et al., "Correction of Butt-Welding Induced distortion by laser forming", Dec. 2006, Transactions of Namri/SME, vol. 34, pp. 579-586.*
O'Brien, "Predicting weld distortion in the design of automotive components" Dec. 2007, Durham Theses, Durham University.*
Machine translation of Japan Patent document No. 2003-140,003, Jul. 2017.*
Machine translation of German Patent document No. DE-19903881, Feb. 2018.*
Hideaki Shirai, et al, "Analysis of the Bending Strain Behavior in Response to Girth Welding of a Cylindrical Workpiece", Collection of Essays, Japan, Association for Welding, Aug. 5, 2003, vol. 21, No. 3, pp. 389-396 (with English translation).

* cited by examiner

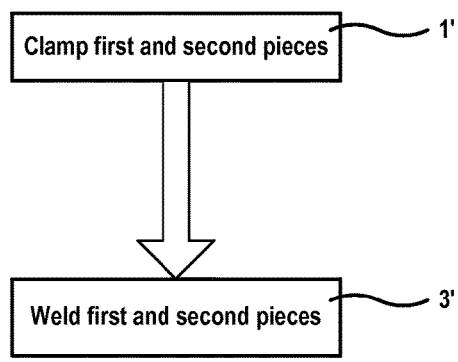
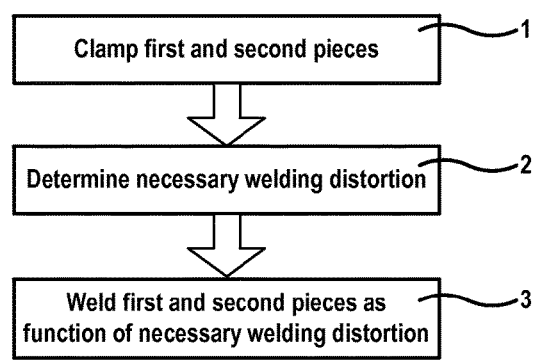
FIG. 1A  FIG. 1B
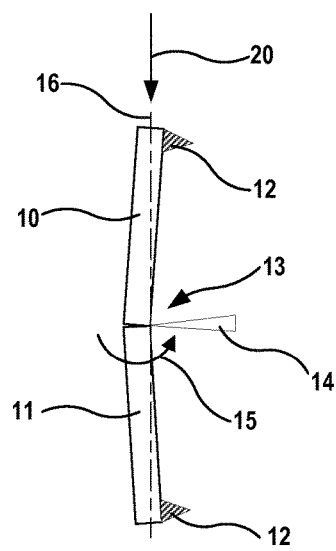
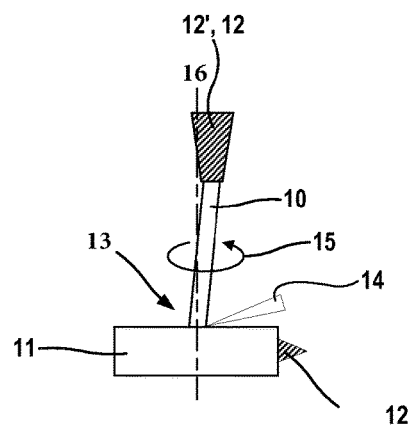
FIG. 2A  FIG. 2B

WELDING METHOD INCLUDING WELDING AS A FUNCTION OF AN ASCERTAINED WELDING DISTORTION; WELDING DEVICE INCLUDING A DETECTION UNIT FOR DETECTING A MISALIGNMENT OF THE WORKPIECES; JOINED PART

BACKGROUND OF THE INVENTION

1. Field of the Invention

The present invention relates to a welding method including welding as a function of an ascertained welding distortion.

2. Description of Related Art

Such devices are known in general. Published German patent application document DE 10 2006 015 383 A1, for example, describes a device and a method for laser welding of a first workpiece to a second workpiece, the device including a laser source and a sensor for monitoring the welding operation. The monitoring is used in particular to monitor the welding depth, which is detected in real time by an online measurement of an optical camera as a sensor and is used as a control variable for the laser source. No determination of a welding distortion is provided.

BRIEF SUMMARY OF THE INVENTION

The welding method according to the present invention, the welding device and the joined part according to the present invention have the advantage over the related art that an intended or necessary welding distortion is ascertained prior to the welding operation and is implemented during the welding operation. As a result, not only is it possible to establish a joint between the first and second workpieces but in addition an intended direction or deformation is achieved between the first and second workpieces. For example, misalignments or distortions and deviations in the contact surfaces of the first and second workpieces may be compensated during welding in this way. Alternatively, creation of an intended bend in the area of the weld seam by entering a corresponding bending parameter or by directly entering a corresponding welding distortion is conceivable. In the third method step, the ascertained welding distortion is implemented through the choice of the corresponding welding parameters. Thus a component which has the desired external geometry with a comparatively high precision is advantageously implementable. In the past, such a high precision of the external geometry of the welded component has been achieved through a comparatively high precision of the joining surfaces of the individual joining partners, i.e., the first and second workpieces. The joining surfaces must be planarized, i.e., ground in advance, for example. In contrast with the related art, the method according to the present invention allows production of such a precision component without having to pretreat the joining surfaces of the first and second workpieces in a comparatively complex and cost-intensive manner. The method according to the present invention includes any welding method and in particular a beam welding method such as laser welding or electric arc welding.

According to a preferred refinement, it is provided that a misalignment between the first and second workpieces is detected in the second method step, the welding distortion being ascertained as a function of the misalignment and in particular for compensation of the misalignment. Compensation of a misalignment between the first and second workpieces is thus created during the welding operation in an advantageous manner. The welding method thus functions simultaneously to establish a fixed connection between the first and second workpieces and at the same time to align the connection between the first and second workpieces. This makes it possible to eliminate pretreatment of the joining surfaces. In the second method step in particular, this misalignment is detected and then the required welding distortion is calculated to compensate for this misalignment. The actual compensation of the misalignment takes place in the subsequent welding operation, the welding parameters being selected in such a way that the created welding distortion causes a compensation of the misalignment.

Misalignment in the sense of the present invention is understood to be any actual arrangement of the first and second workpieces deviating from an intended setpoint arrangement, so that the misalignment is by no means necessarily to be understood as deviations between the orientation of the first workpiece and the orientation of the second workpiece.

According to another preferred refinement, it is provided that in the third method step, a welding beam is adjusted as a function of the welding distortion, so that preferably the radiant power, the focusing and/or the direction of the welding beam are adjusted. A variation in the welding distortion is achieved through an appropriate variation in the radiant power, the focusing and/or the beam direction in an advantageous manner. For example, a definite increase or decrease in the welding distortion is achieved by increasing or decreasing the radiant power accordingly.

According to another preferred refinement, it is provided that in the third method step, the first and the second workpieces are rotated about an axis of rotation, so that the corresponding angle of rotation is adjusted as a function of the welding distortion. The angle of rotation in the sense of the present invention includes in particular the alignment angle during the start of welding in relation to the intended welding distortion to be achieved, i.e., the angle between the welding beam and the joint at which the welding operation is started. The joint of the first and second workpieces is rotated about its own axis in a particularly advantageous manner, so that the radiant power is preferably essentially constant over all angles of rotation and thus a comparatively permanent and uniform joint between the first and second workpieces is achieved. The angle of rotation is also advantageously adjusted as a function of the intended welding distortion because a variation in the angle of rotation allows a targeted increase and/or decrease in energy input in certain areas between the first and second workpieces, achieving a corresponding influence on the resulting welding distortion. Furthermore, the location of the overlap area and/or a partial area opposite this overlap area is/are determined by the angle of rotation.

According to another preferred refinement, it is provided that in the third method step, after a complete revolution of the first and second workpieces, an overlap area is created in which the weld seam covers itself in the overlap area. After a rotation of the joint of the first and second workpieces with respect to the welding beam by more than 360 degrees, the weld seam created begins to cover itself in its own initial area. Through the choice of a corresponding angle of rotation the size of the overlap area is thus established, the created welding distortion depending directly on the size of the overlap area in an advantageous manner.

According to another preferred refinement, it is provided that in the third method step the size of the overlap area is adjusted as a function of the welding distortion and/or a reduced radiant power is set in the overlap area. The welding distortion may advantageously be adjusted through the size of the overlap area on one side of the two workpieces, a smaller overlap area creating a smaller welding distortion in the direction of the overlap area and an enlarged overlap area creating a larger welding distortion in the direction of the overlap area.

According to another preferred refinement, it is provided that in the third method step an elevated radiant power is set in a partial area opposite the overlap area with regard to a rotation by 180 degrees and/or an additional radiation dosis is applied. An elevated radiant power or an additional radiation dosis in a partial area opposite the overlap area results in a welding distortion which opposes the welding distortion in the direction of the overlap area, so that the welding distortion in the direction of the overlap area is at least partially compensated or overcompensated. The resulting welding distortion is thus controllable. The compensation is implementable in the partial area during the first rotation of the first and second workpieces through an increased radiant power in the partial area, so that the welding operation does not require any additional time and/or any additional rotations in comparison with the related art in an advantageous manner. Alternatively, the compensation in the partial area is to be implemented by an additional radiation dosis in the partial area which is introduced into the partial area during a second rotation. This has the advantage that no increased radiant power is necessary.

Another subject matter of the present invention is a welding device. A misalignment here between the first and second workpieces is detected by the detection unit. The advantage of this is that a required welding distortion for correction or compensation of the misalignment is to be calculated from the misalignment and used to adjust the welding parameters in a subsequent welding operation. The welding device according to the present invention thus allows not only production of a permanent connection between the first and second workpieces but also allows alignment of the connection between the first and second workpieces during welding, so that a component is manufacturable comparatively precisely from the first and second workpieces having a desired external geometry. This welding device is suitable in particular for welding elongated workpieces, in particular those shaped like a rod and/or tube, because in this way a misalignment between the first and second workpieces due to non-plane-parallel joining surfaces of the first and second workpieces, for example, has an especially great effect. Furthermore, a comparatively good axial runout of the first and/or second workpieces may thus be achieved even when the joining surfaces of the starting workpieces are not plane-parallel.

According to a preferred refinement, it is provided that control of the welding head and/or a drive device of the holder for jointly moving the first and second workpieces is provided by the detection unit. As already explained above in detail, to take into account and correct the misalignment, the welding beam is adjusted with regard to radiant power, focusing and/or beam direction through the beam head and/or the relative position or relative movement, i.e., in particular the angle of rotation between the first and second workpieces on the one hand and the welding beam on the other hand by the drive device, the beam head and/or the drive device being controlled directly or indirectly by the detection unit to achieve the intended welding distortion.

According to another preferred refinement, it is provided that the detection unit includes an optical and/or mechanical detection unit. The optical detection unit in particular preferably includes a laser beam lens, which is used for a comparatively precise ascertainment of the misalignment between the first and the second workpiece. Alternatively, the mechanical detection unit preferably includes a tactile detection unit, so that the misalignment is "sensed" or ascertained by contact. Furthermore, it is conceivable for the distortion to be detectable by simply measuring the deformation of the workpiece and/or the position of the workpiece holder. For those skilled in the art, it is self-evident that the detection of the distortion may also be implemented by using any other suitable method.

Another subject matter of the present invention is a joined part manufactured from a first and a second workpiece by the method according to the present invention and/or manufactured using a welding device according to the present invention.

BRIEF DESCRIPTION OF THE DRAWINGS

FIG. 1a shows a schematic block diagram of a welding method according to the related art.

FIG. 1b shows a schematic block diagram of a welding method according to a first specific embodiment of the present invention.

FIGS. 2a, 2b show schematic side views of welding devices according to a first and a second specific embodiment of the present invention.

DETAILED DESCRIPTION OF THE INVENTION

Figure 3:
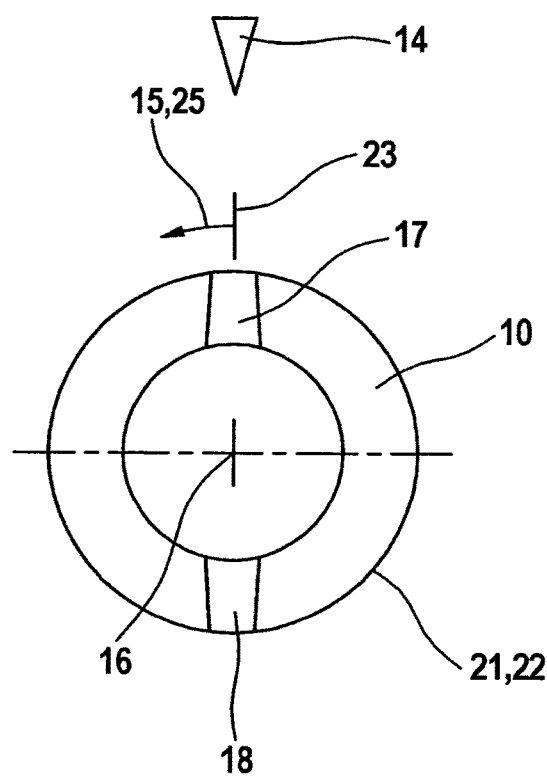
FIG. 3 shows a schematic top view of a welding device according to a third specific embodiment of the present invention.

FIG. 1a shows a schematic block diagram of a typical welding method according to the related art, a first and a second workpiece initially being clamped in a holder in a first step 1' in such a way that they come in contact with one another at their joining surfaces. Next in a second step 3' the first and second workpieces are excited by a drive device to execute a common rotational movement about an axis of rotation and the actual welding operation is performed. A welding beam, in particular a laser beam, is directed at a contact point between the first and the second workpieces, the rotational movement of the welding beam traveling along the circumference of the contact point and thus a weld seam is created along the circumference, so that a solid and completely peripheral weld joint is created between the first and second workpieces.

FIG. 1b shows a schematic block diagram of a welding method according to a first specific embodiment of the present invention, in which the welding method according to the present invention resembles the welding method illustrated in FIG. 1a, a necessary or intended welding distortion being initially ascertained in a second method step 2 after clamping the first and second workpieces into the holder in first method step 1. To do so, the joint of the first and second workpieces is measured with the aid of a detection unit, and an undesirable misalignment or a misalignment to be corrected between the first and second workpieces is detected. In particular the actual arrangement of the first and second workpieces is detected and compared with a setpoint arrangement. On the basis of the detected misalignment, a necessary welding distortion is calculated, which is necessary for compensation of the detected misalignment, so that the arrangement of the first and second workpieces corresponds to the setpoint arrangement after completion of the welding operation. Next in a third method step 3, the joint of the first and second workpieces is excited to a rotational movement about the axis of rotation and the welding operation is started. The welding operation and the rotational movement of the joint are performed as a function of the calculated welding distortion, in such a way that after termination of the welding operation, the misalignment is precisely compensated by the resulting welding distortion, preferably the radiant power and/or the rotational movement of the joint of the first and second workpieces being controlled as a function of the ascertained welding distortion. To create this welding distortion, the radiant power in particular is controlled as a function of the starting angle between the joint and the welding beam.

FIGS. 2a and 2b show schematic side views of welding devices according to a first and a second specific embodiment of the present invention, in which the welding devices are provided for performing a welding method as shown in FIG. 1b according to the first specific embodiment of the present invention. The first specific embodiment shown in FIG. 1b includes a first and a second workpiece 10, 11, which are held in a holder 12. The main extension direction of first workpiece 10 and the main extension direction of second workpiece 11 form an angle to one another which is not equal to 180 degrees, i.e., first and second workpieces 10, 11 are not aligned exactly parallel to one another. This may be due, for example, to non-plane-parallel joining surfaces of first and second workpieces 10, 11. The deviation between the orientation of first and second workpieces 10, 11 is referred to below as the misalignment. This misalignment is ascertained with the aid of a detection unit (not shown), for example, a laser beam lens, and by taking into account the misalignment thereby ascertained, a welding distortion is calculated which is suitable for precisely compensating the misalignment after completion of the welding operation. Next a welding beam 14 is emitted by a welding head (not shown) into contact area 13 between first and second workpieces 10, 11, so that first and second workpieces 10, 11 are joined to one another in contact area 13. First and second workpieces 10, 11 are driven by a drive device (not shown) to a common rotational movement 15 about an axis of rotation 16. The radiant power of welding beam 14 and rotational movement 15 are adjusted as a function of the calculated welding distortion to create a resulting welding distortion in contact area 13 simultaneously with the creation of the weld joint, which precisely compensates the misalignment. FIG. 2b shows a second specific embodiment, which is essentially identical to the first specific embodiment, second workpiece 11 having a round or cuboid workpiece and first workpiece 10 being clamped between second workpiece 12 and a holder in the form of a laterally elastic hold-down 12'. Hold-down 12' is elastic with respect to a lateral movement, i.e., perpendicular to axis of rotation 16, and at the same time functions as the detection unit, the misalignment of first workpiece 10 with respect to second workpiece 11 being measured by the lateral position of hold-down 12'. The misalignment is thus zero when the lateral position of hold-down 12' is situated exactly above the contact point or on axis of rotation 16.

FIG. 3 shows a schematic top view of a welding device 1 according to a third specific embodiment of the present invention, in which the third specific embodiment corresponds essentially to the first specific embodiment shown in FIG. 2a, and welding device 1 is illustrated in a top view from the direction illustrated by arrow 20 in FIG. 2a. Welding beam 14 is directed to the contact point between the first and second workpieces 10, 11 and at the same time the joint of the first and second workpieces is rotated about the axis of rotation 16 in relation to welding beam 14 about its own axis. This produces a weld seam 21 extending along-circumference 22 of the joint. To achieve a secure weld joint, weld seam 21 is designed to be longer than circumference 22, so that weld seam 21 covers itself at starting point 23 after a complete revolution of the joint by 360 degrees. The area in which weld seam 21 covers itself is referred to as overlap area 17. The welding distortion is usually directed in the direction of this overlap area 17. To reduce such a welding distortion in the direction of overlap area 17, control of welding beam 14 as illustrated in FIG. 4c is conceivable, radiant power 24 of welding beam 14 being reduced in overlap area 17. In an alternative specific embodiment, it is conceivable to introduce an increased radiant power 24' during the first revolution of the joint, as illustrated in FIG. 4b, in a partial area 18, which is opposite overlap area 17 in relation to axis of rotation 16. Partial area 18 begins at a rotation of 180 degrees. Increased radiant power 24' has a compensatory countereffect to the welding distortion in the direction of overlap area 17. In another specific embodiment, shown in FIG. 4a, it is conceivable that in an additional second rotation of the joint, i.e., in a rotation between 360 and 720 degrees, only partial area 18 is irradiated with an additional radiation dosis 24". Compensation of the welding distortion in the direction of the overlap area is again achieved through this additional radiation dosis 24", which is emitted essentially in an area beyond 540 degrees.

Figure 4A:
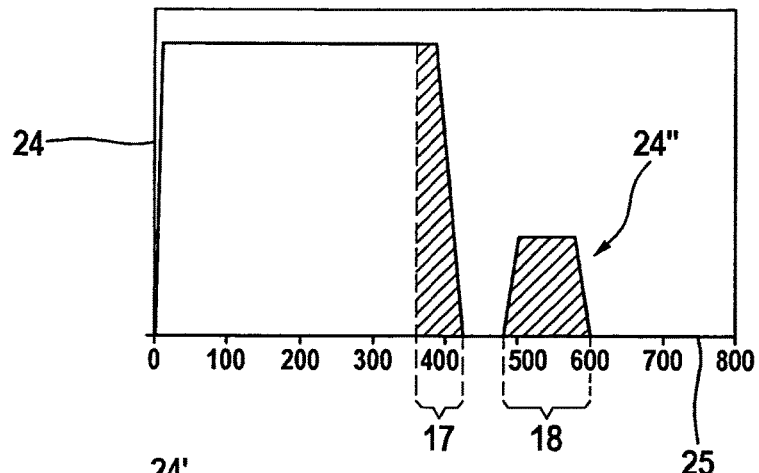
FIGS. 4a, 4b, and 4c show schematic diagrams of the radiant power as a function of the angle of rotation of welding methods according to second, third and fourth specific embodiments of the present invention.
Figure 4B:
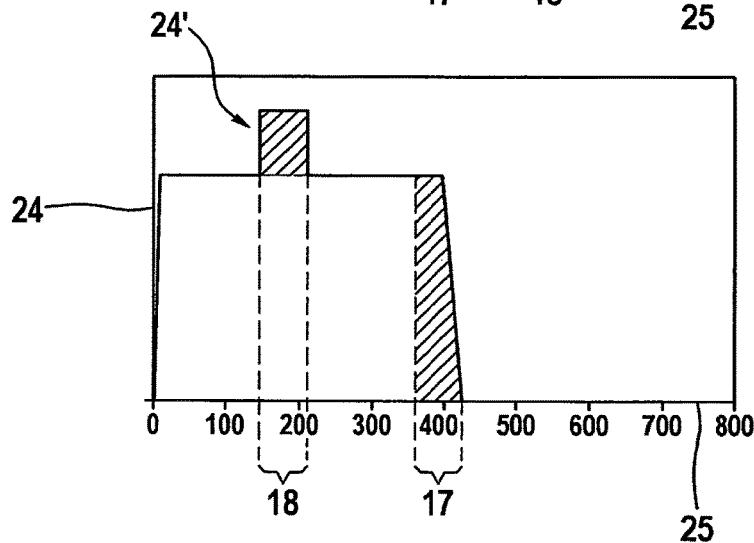
Figure 4C:
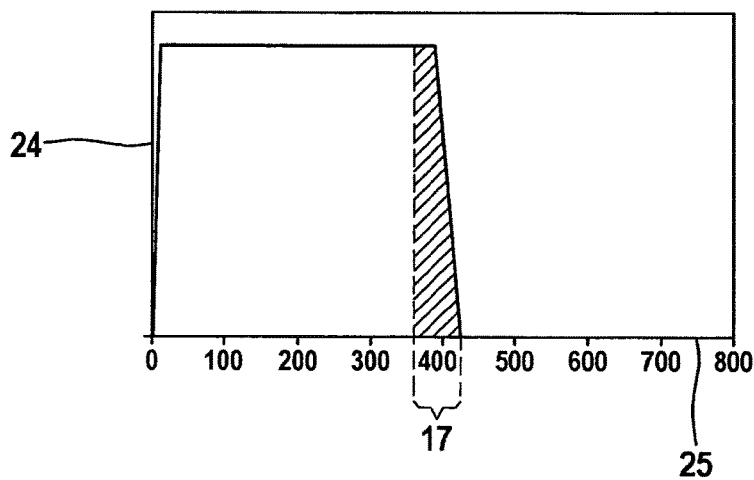

FIGS. 4a, 4b, 4c show schematic diagrams of radiant power 24 as a function of angle of rotation 25 of the welding method according to second, third and fourth specific embodiments of the present invention. The difference in the course [of] the radiant power as a function of angle of rotation 25 has already been described with reference to FIG. 3, in FIGS. 4a, 4c and 4b, angle of rotation 25 in degrees being plotted on the abscissa and radiant power 24 or the equivalent radiation temperature being plotted on the ordinate. An angle of rotation 25 of 0 degrees corresponds to starting point 23. The radiation curve illustrated in FIG. 4a includes a uniform radiant power 24 during the first rotation (from 0 to 360 degrees), in which radiant power 24 in overlap area 17 (between 360 and approximately 400 degrees) is reduced to zero and a radiant power 24 of zero is set for compensation of the welding distortion in the direction of overlap area 17 during the second rotation (from 360 to 720 degrees) outside of the overlap and partial areas 17,18, and an additional radiation dosis 24" is deposited in partial area 18 or around partial area 18 (between approximately 500 and 600 degrees). Radiant power 24 of additional radiation dosis 24" is preferably lower than radiant power 24, which is irradiated uniformly during the first rotation. The radiation curve illustrated in FIG. 4b shows a radiant power, which is lower on the whole during the first rotation and is increased briefly only in partial area 18. This briefly increased radiant power 24' results in a compensation of the welding distortion in the direction of overlap area 17. FIG. 4a shows a reduced radiant power 24, so that the welding distortion is reduced on the whole in the direction of overlap area 17. Due to these different curves of radiant power 24 as a function of the angle of rotation 25, a partial or accurate compensation or an overcompensation of the welding distortion in the direction of overlap area 17 is adjustable, depending on the intended welding distortion, so that the misalignment may be corrected in the desired manner during the welding method by a corresponding choice of radiant power 24 and/or the rotational movement.

What is claimed is:

1. A laser welding method for joining a first workpiece to a second workpiece, comprising:
   bringing the first and second workpieces into contact with one another in a first step;
   ascertaining a necessary welding distortion in a second step based on a misalignment in the contact surfaces of the first and second workpieces in the unwelded arrangement of the first and second workpieces, wherein the misalignment is a deviation of an actual arrangement of the first and second workpieces from an intended setpoint arrangement, wherein the ascertaining is performed prior to welding the first and second workpieces to one another; and
   welding the first and second workpieces to one another as a function of a compensation for the ascertained welding distortion in a third step,
   wherein a welding beam is adjusted in the third step as a function of the necessary welding distortion, and wherein the adjustment of the welding beam includes adjustment of at least one of the radiant power, the focusing and the direction of the welding beam in relation to at least one of the first and second workpieces,
   wherein the first and second workpieces are rotated about an axis of rotation during welding in the third step, and wherein the angle of rotation of the first and second workpieces is adjusted as a function of the necessary welding distortion,
   wherein an overlap area of a weld seam is created in the third step after a complete revolution of the first and second workpieces, and wherein a first portion of the weld seam overlaps with a second portion of the weld seam in the overlap area, and wherein the size of the overlap area is adjusted in the third step as a function of the necessary welding distortion.

2. The welding method as recited in claim 1, wherein a misalignment between the first and second workpieces is detected in the second step, and wherein the necessary welding distortion is ascertained as a function of the misalignment to compensate for the misalignment.

3. The welding method as recited in claim 1, wherein in the third step an increased radiant power is applied in a partial area 180 degrees opposite the overlap area.

* * * * *